Aug. 7, 1962  M. J. BROWN  3,048,705
AUTOMATIC DEMAND CONTROL COMPUTER
Filed May 28, 1959  8 Sheets-Sheet 1

Fig. 1

WITNESSES
John F. Healy, Jr.
James F. Young

INVENTOR
Myron J. Brown
BY
Paul E. Friedemann
ATTORNEY

Aug. 7, 1962    M. J. BROWN    3,048,705
AUTOMATIC DEMAND CONTROL COMPUTER
Filed May 28, 1959    8 Sheets-Sheet 8

Fig. 2g

United States Patent Office 3,048,705
Patented Aug. 7, 1962

3,048,705
AUTOMATIC DEMAND CONTROL COMPUTER
Myron J. Brown, Forest Hills, Pa., assignor to Westinghouse Electric Corporation, East Pittsburgh, Pa., a corporation of Pennsylvania
Filed May 28, 1959, Ser. No. 816,635
8 Claims. (Cl. 307—35)

This invention relates to an automatic demand control computer and more particularly to a computer capable of monitoring the delivery of power to a load for the purpose of maintaining the power delivery and particularly, the demand to the load at a desired level.

Users of electrical power purchased from electric utilities generally have purchase contracts which not only include a charge for energy, but also include a charge for demand. It is, therefore, desirable to regulate the demand so that maximum power may be drawn from a utility without exceeding the contract price for power demand previously established. Certain types of electrical loads are particularly suited to this type of control such as electrochemical processes.

It is an object of this invention to provide a detector and control system for establishing and maintaining a maximum demand level during the supply of power to a load.

It is another object of this invention to provide a means for establishing the desired maximum demand.

It is another object of this invention to provide a control system capable of raising or lowering the supply of power to a load in order to maintain the demand below a desired level.

It is another object of this invention to provide a phase sensitive control for the raise and lower controls for selecting the desired raised or lowered condition.

Other objects, purposes and characteristic features will become obvious as the description of the invention progresses.

In practicing this invention, there is provided a supply line to a load having a means for detecting the supply of power and demand being delivered to the load. The demand and supply power to the load is detected and compared with a manually adjusted lever of maximum demand during a selected demand period. The output of this comparison circuit is then fed into a phase sensitive control to control a raise and lower selection device capable of raising or lowering the supply of power to the selected load. In order to determine whether the desired load selection has been reached, a feedback control is provided for neutralizing the detection means input to the phase sensitive control. When these two signals are balanced, the load will be operating at the desired demand level.

In each of the several views, similar parts bear like reference characters.

Figure 1:
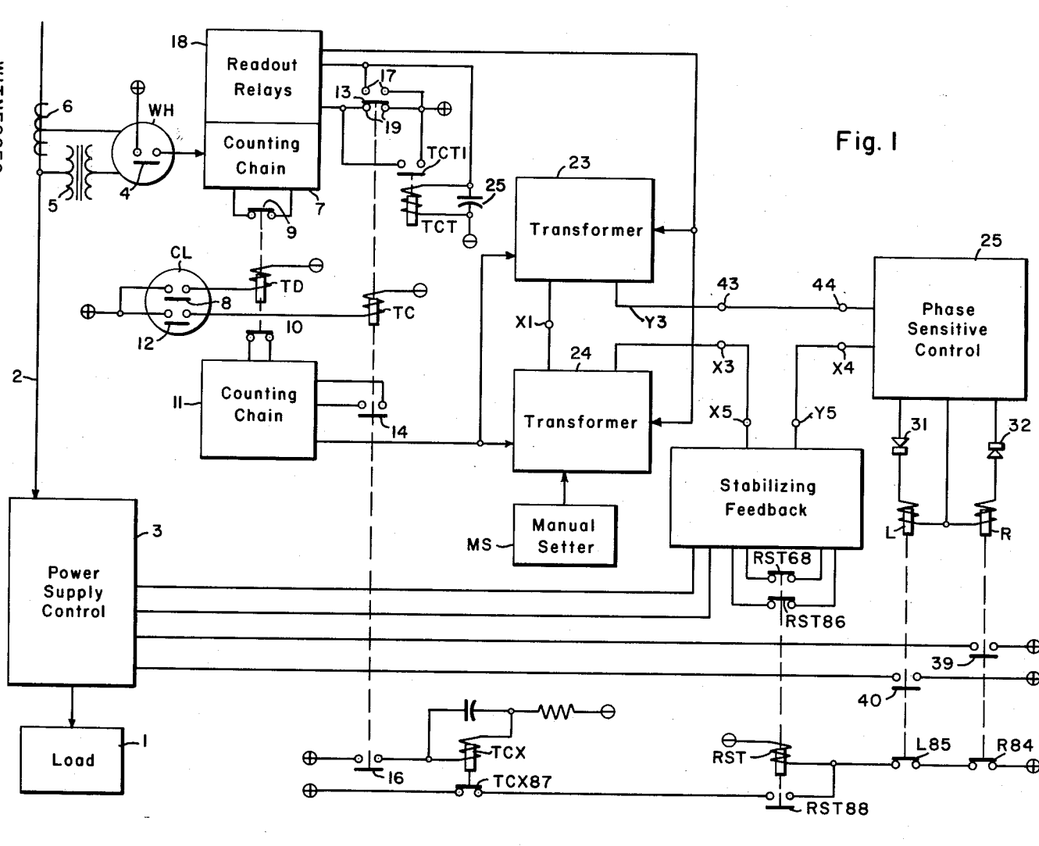
FIG. 1 is a schematic view of the demand regulating computer.

In the schematic diagram shown in FIG. 1, the load 1 is provided with power through the power supply line 2 having inserted therein a power control device such as a tap changing transformer control device 3 for adjusting the supply of power from the supply line 2 to the load 1. In order to determine the amount of power being supplied from the power supply line 2, there is provided a watthour demand meter WH having a contact 4 capable of being opened and closed at a rate directly proportional to the amount of power being supplied to the load 1 through the supply line 2. The watthour demand meter WH is provided with a voltage sensing transformer 5 and a current detecting transformer 6 determining the power being supplied by the supply line 2. The contact 4 of the watthour demand meter WH controls the operation of a counting chain 7 to cause the counting chain to count the number of impulses being provided by the opening and closing contact 4. The number of counting relays of the chain energized within a time period is directly proportional to the amount of power being supplied over the supply line 2 and detected by the watthour demand meter WH. In order to make a determination of the amount of power being supplied over a time period hereinafter called the demand period, a time clock CL is provided. The time clock CL is provided with a contact 8 which is momentarily closed at the beginning of the demand period, then opened and maintained open throughout the demand period, for example, thirty minutes. Momentary closing of the contact 8 at the beginning of a demand period resets all the counting relays to zero to allow the counting relays to start a new count. Specifically, reclosing of the contact 8 at the beginning of the demand period energizes the relay TD opening its contacts 9 and 10 causing the reset of the counting relays in the counting chain 7 and the counting relays in the counting chain 11, respectively. Deenergization of the TD relay again closes the contacts 9 and 10 preparing the counting chains 7 and 11 for a new count within a new demand period.

If we assume that the counting relays of the counting chains 7 and 11 (the details of which will be explained hereinafter) have started their counting operation with the counting chain 7 responding to the amount of power being supplied over the supply line 2 and the counting chain 11 responding to time periods established by the time to compute relay TC to be explained hereinafter, it can be seen that the information stored in the counting chains must be interpreted at some definite time to provide a useful output. In order to accomplish this, the TC relay is provided. The TC relay is energized by a contact 12 in the clock CL operable at the certain specified time periods such as five minute intervals for causing the TC relay to be momentarily energized. To accomplish this, the contact 12 is momentarily closed during successive time periods, for example, five minute periods, following the start of a demand period. Operation of the contact 12 causes the TC relay to be momentarily energized and again deenergized. The relay TC in turn causes its contacts 13 and 16 to be shifted from their normally deenergized positions to their energized positions and return. Operation of the movable contact 13 to its energized position closes the contact points 17 to energize a read-out relay of the read-out relay group 18 associated with the counting chain 7 in a manner to be described hereinafter. The movable contact 13 in its movement from its contact points 17 to its contact points 19 is provided with a by-pass circuit parallel to the contact points 19 by the front contact TCT1 of a slow drop relay TCT. The slow drop relay TCT is connected from one source terminal to the other through the contact points 17 of the TC relay. The relay TCT is energized when the contact points 17 are completed and the relay is made slow dropping by the capacitor 25 connected thereacross. Operation of the movable contact 13 from the contact points 17 to the contact points 19 does not allow an interruption of the now energized read-out relay since the slow dropping relay TCT maintains a completed parallel path to the contact points 19 of the TC relay thus maintaining a complete hold circuit even though the relay TC is in motion toward its deenergized position. The counting chain 11 relays are also energized for read-out and energization of the primaries of the transformer groups 23 and 24 by the time to compute relay TC contact 14. With the read-out relays and counter of chain relays properly conditioned as explained hereinbefore, the transformer groups 23 and 24 are conditioned for energization. Energization of the transformer groups 23 and 24 results in the application of output energy in the conductors X3 and Y3.

The magnitude of output energy supplied by the transformer groups 23 and 24 to the conductors X3 and Y3 is determined by the comparison of the actual power being used or supplied over the supply conductor 2 and the energy level etablished by the manual setter MS controlling the output energy from the transformer group 24. In this manner, the manual setter MS can provide a means of selecting the maximum demand to be selected as a desirable demand level about which the computer will provide control.

In order to provide an understanding of how the proper voltage on the conductors X3 and Y3 is obtained, an explanation of the counting chains and read-out relays and their control over the transformer groups 23 and 24 will now be explained in detail.

If we assume that a demand period has just been initiated by the TD relay being energized and again deenergized by the clock CL and that the load 1 is using power from the supply line 2, it can be seen that the contact 4 will be opening and closing at a rate proportional to the amount of power being supplied. If we now refer to FIG. 2b, it can be seen that contact 4 being intermittently opened and closed provides an energizing path for the count relay U1 upon its first closure operation. This path can be traced from the B terminal of a suitable source of supply (not shown) over the back contact 9 of the TD relay now closed, the now closed contact 4 of the demand meter WH, the now closed back contact of the units counting relay U10b, the now closed back contact U13d of the sequencing relay U13, the now closed back contact U12a of the sequencing relay U12 and the now closed back contact U11a of the sequencing relay U11, the winding of the counting relay U1 to the source terminal N. Energization of the U1 relay causes the U1 relay to close its front contact U1a to provide a hold circuit for maintaining the U1 relay energized. The hold circuit can be traced from the source terminal B, the closed back contact 9 of the demand relay TD, the closed back contact U12c of the sequencing relay U12, the now closed front contact U1a of the count relay U1, the winding of the relay U1 to the source terminal N. The sequencing relay U11 is maintained deenergized due to the fact that a shunt circuit is completed in parallel with the winding U11 over the previously recited pickup circuit for the count relay U1. Opening of the contact 4 of the demand meter WH, however, interrupts the parallel shunt circuit causing the sequencing relay U11 to become energized over the previously recited stick circuit of the relay U1. Energization of the U11 sequencing relay further assures interruption of a pickup circuit for the relay U1 and prepares a pickup circuit for the count relay U2 by the closure of its front contact U11b. In addition to the closure of the U1a contact, completing in the stick circuit for the U1 relay, the U1b contact of the U1 relay is closed. With the U1b contact closed, a pickup circuit for the U2 relay is prepared with the actual pickup occurring on the next reclosure on the contact 4 in the demand meter WH. This circuit can be traced from the source terminal B over the previously recited contacts U10b, U13d, U12a, the now closed U11b contact, the now closed U1b contact, the relay winding U2 and to the source terminal N. Energization of the count relay U2 causes its contact U2a to complete the stick circuit for the relay U2 through the winding of the sequencing relay U12 and the back contact U13c of the sequencing relay U13. At the same time, the U2b contact of the relay U2 prepares a pickup circuit for the next count relay U3 and with the interruption of the contact 4 of the demand meter WH, the sequencing relay U12 becomes energized completing the pickup circuit for the relay U3 except for the now open contact 4 of the demand meter WH. Energization of the U12 relay causes the contact U12c to be open interrupting the stick circuit for the U1 count relay causing this relay to again be deenergized. The next closure of the contact 4 of the demand meter WH results in the energization of the U3 count relay over a pickup circuit similar to that described in connection with the count relays U1 and U2 establishing a stick circuit through the U13 sequencing relay. A stick circuit for the U3 relay is similar to the stick circuits described in connection with the U1 and U2 count relays with the exception that the stick circuit is maintained over the back contact of the units count relay U10. Energization of the U3 relay prepares a circuit for the energization of the U4 relay which is maintained energized over a stick circuit including the U11 sequencing relay resulting in a repeat of the operation of the three sequenceing relays for subsequent count relays. Continued opening and closing of the contact 4 of the WH demand meter continues to cause the energization of progressively higher count relays and the operation of the sequencing relays for maintaining the proper count relay energized until the final count relay U10 of the units group is energized. When this happens, the U10 relay closes its contact U10d to cause the energization of the first ten's relay T1. The ten's relay T1 is maintained energized over a stick circuit similar to the stick circuits described in connection with the units relays until the units relays have again had time to count through the full sequence U1 through U10. When the full units count has again occurred, the U10d contact causes the energization of the next ten's relay T2. This process is repeated until the final ten's relay T10 is energized causing the first hundred's relay H1 to be energized by the closure of the T10d contact of the T10 relay. The H1 relay is maintained energized in a manner similar to those previously described until the ten's relays have counted another complete sequence causing the energization of the H2 relay etc. until the H10 relay is energized or the end of the demand period is reached. The counting time established by the counting relays of the units, tens and hundreds groups is arranged to be sufficiently long that the time of the demand period expires before the H10 relay is energized in response to the quantity of power being supplied over the conductor 2.

Each of the count relays U1 through U10, T1 through T10 and H1 through H10 is provided with a read-out relay for providing read-out of the count level at a period established by the time to compute relay TC. Operation of the read-out relays will now be described.

Figures 2A, 3:
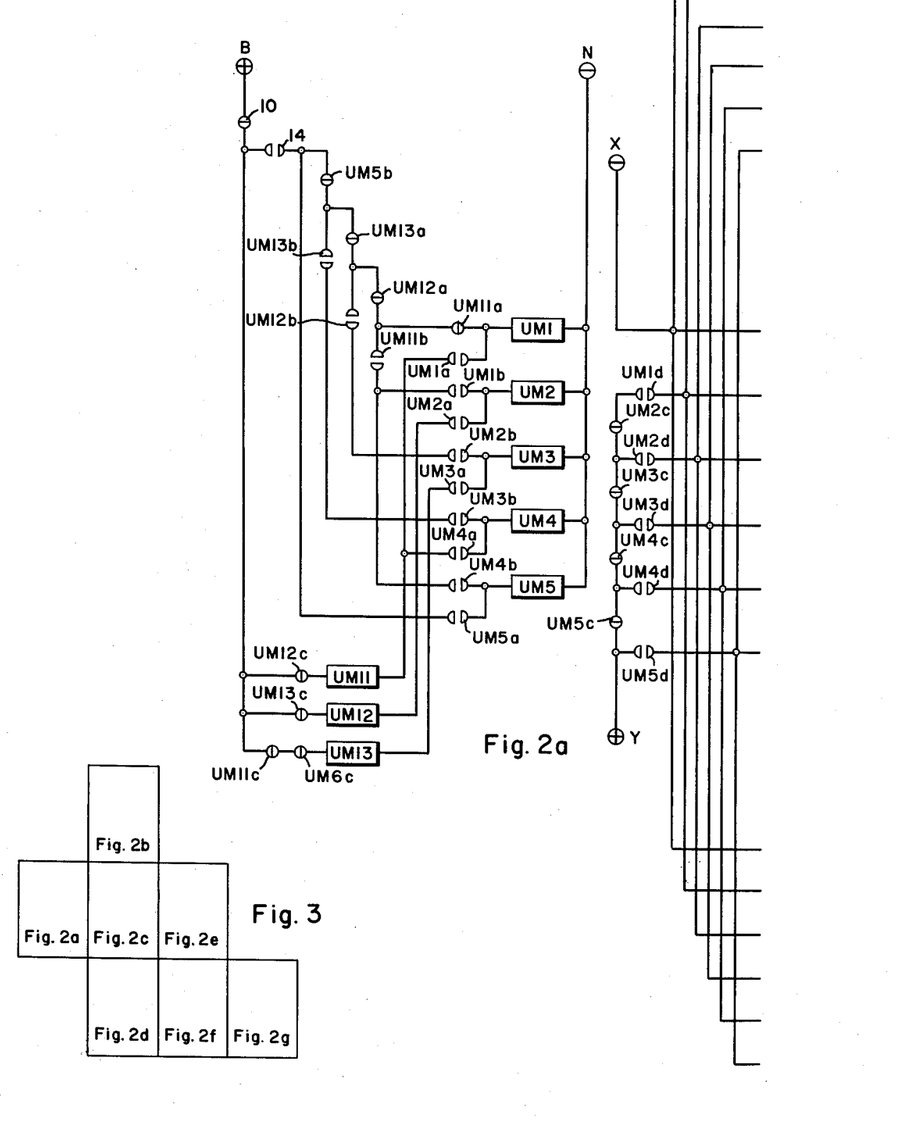
FIGS. 2a through 2g, inclusive, are detailed diagrammatic views of the circuitry needed to show one embodiment of the demand control regulator shown in block form in FIG 1.
FIG. 3 is a drawing sheet placement schematic.
Figure 2B:
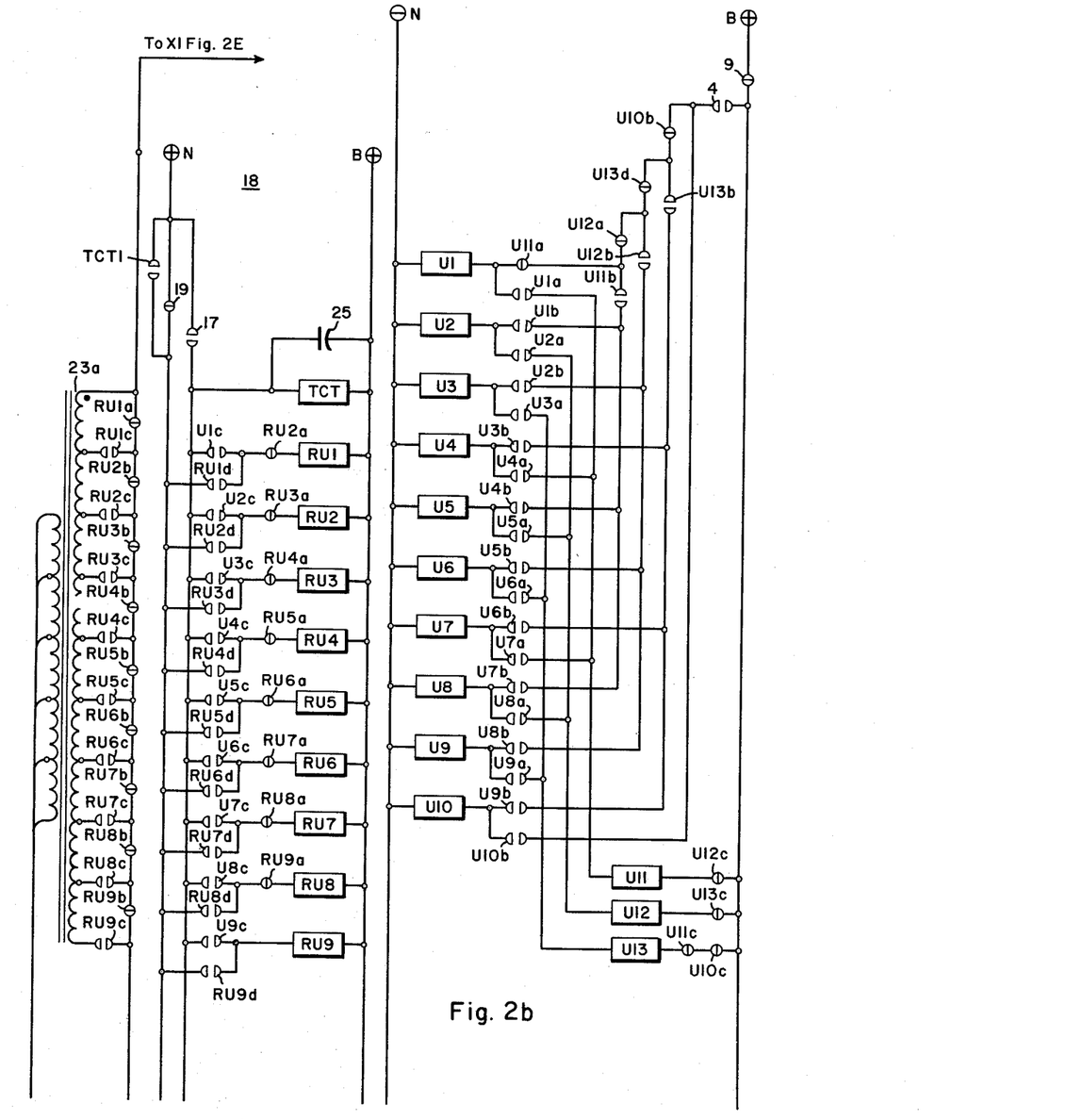
Figure 2C:
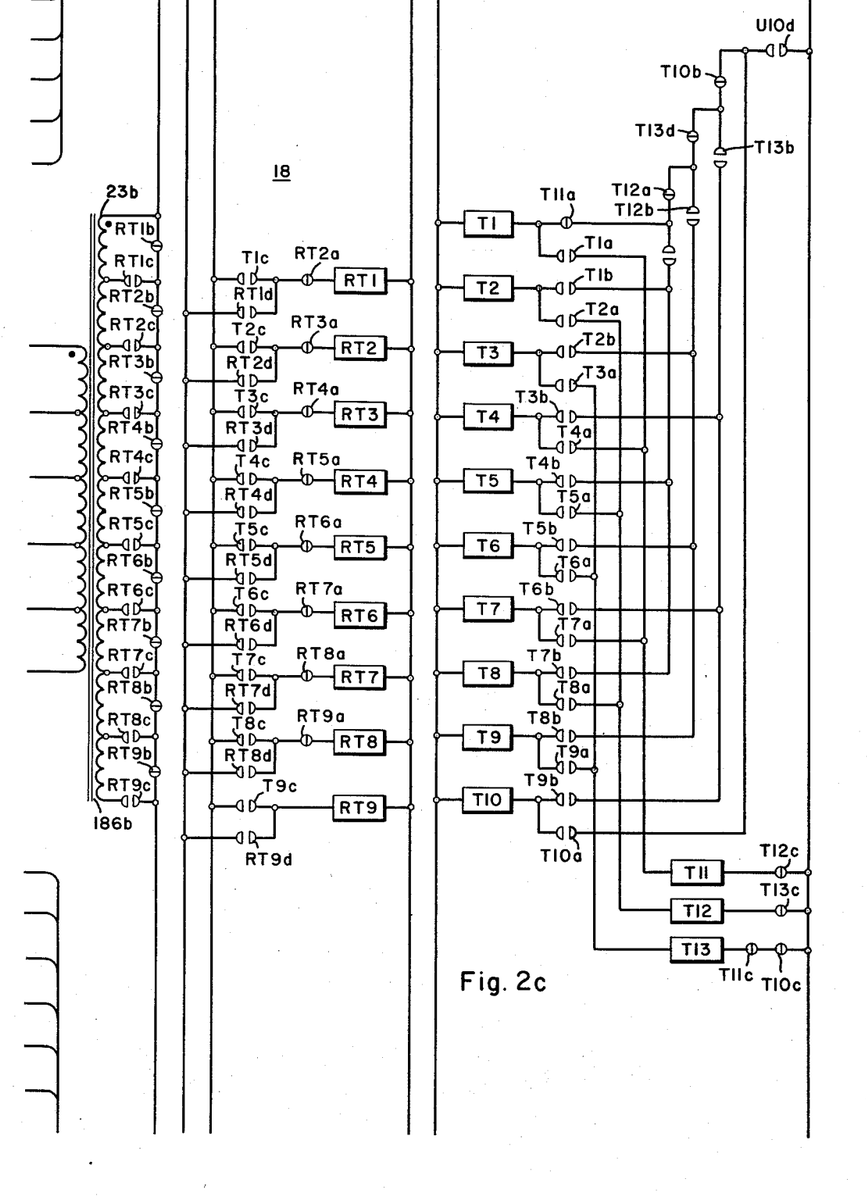
Figure 2D:
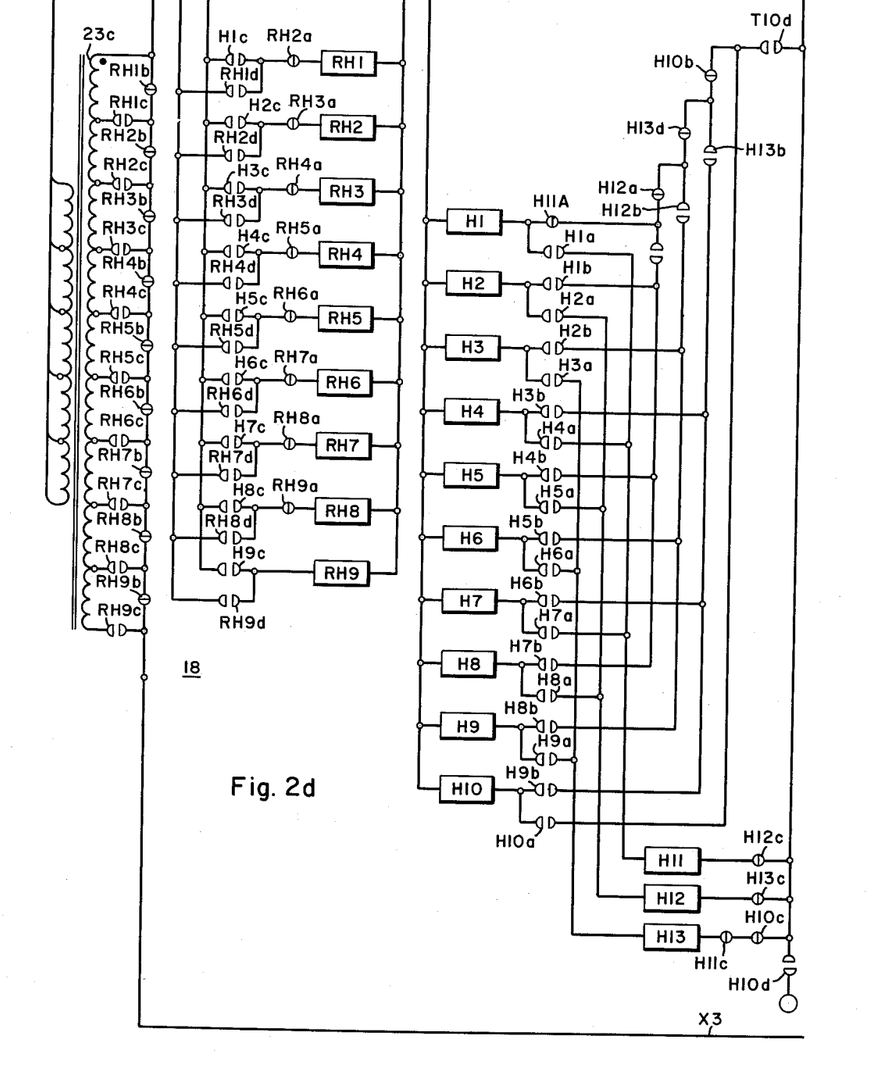
Figure 2E:
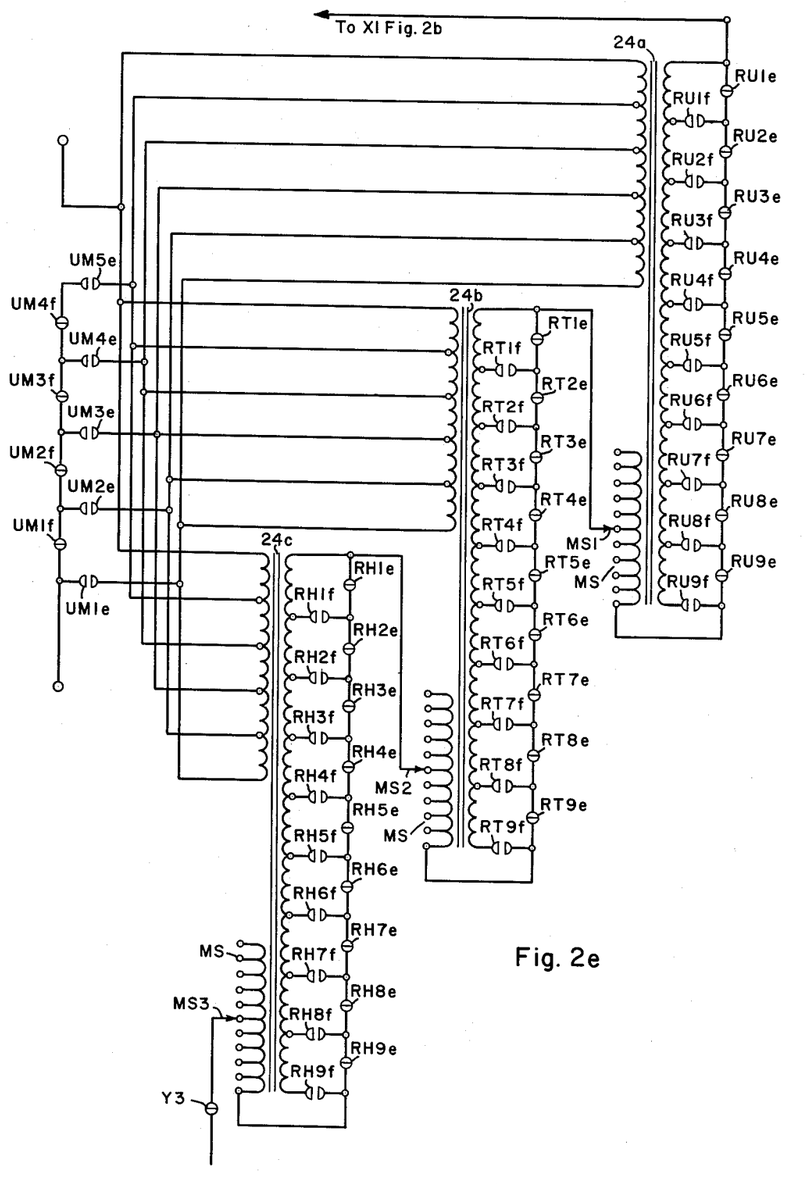

If we assume that the count relay U1 is energized, it can be seen that the count relay U1 also closes its contact U1c preparing a pickup circuit for the read-out relay RU1. The pickup circuit can be traced from the source terminal B through the winding of RU1, the back contact RU2a of the next highest read-out relay RU2, the now closed U1c of the count relay U1, the now open contact points 17 of the time to compute relay TC to the source terminal N. It can be seen, therefore, that in response to closure of the movable contact 12 of the clock CL at each five minute period, the TC relay becomes energized momentarily causing the contact points 17 to be closed by the movable contact 13 resulting in the energization of the read-out relay RU1. In order to maintain the read-out relay energized, a stick circuit for the relay RU1 is prepared over the front contact RU1d of the relay RU1 and the back contact 19 of the TC relay. It is pointed out again that the contact 13 of the TC relay is by-passed by the TCT1 contact only during each deenergizating motion of the TC relay, therefore establishing the closure of the contact points 19 completing the stick circuit for the RU1 relay before the relay TCT drops out.

Energization of the RU1 read-out relay causes closure of the contact RU1c and interruption of the contact RU1a used to control the completion of the circuit for the secondary winding of the transformer 23a of the transformer group 23. Prior to the energization of the RU1 relay, the back contact RU1a placed in series with the back contact of each of the other relays provides a by-pass circuit for the secondary of the transformer 23a. Energization of the RU1 relay, however, causes the RU1a contact to interrupt this by-pass circuit and the RU1c contact to complete a circuit for the first segment of the secondary of the transformer 23a. The remaining segments of the transformer 23a secondary are still maintained in the by-pass condition by the remaining read-out relays RU2 through RU9.

At the end of the next time to compute period established by the clock CL, a different read-out relay will be energized, such, for example, the read-out relay RU7. The previously energized read-out relay RU1 is deenergized through the shift of the contact member 13 of the TC relay from its contact points 19 to its contact points 17 which is of sufficient duration to allow all read-out relays to be deenergized before the new read-out relay is energized. The shift of the contact member 13 from its contact point 17 to its back contact points 19 is shunted by the contact TCT1, and, therefore, the RU7 read-out relay is maintained energized in a manner similar to the previously described read-out relay RU1. The read-out relay RU7 upon becoming energized, closes its contact RU7c and opens its contact RU7b. This operation removes the by-pass circuit from seven segments of the secondary winding of the transformer 23a and completes the path through the seven segments with only the two remaining segments of the secondary being by-passed. The circuit can be traced from the terminal point X1 through the first seven segments of the transformer secondary through the contact RU7c and the closed back contacts RU8b and RU9b. The by-pass circuit for the first seven segments is interrupted by the contact RU7b.

In addition to the read-out relay group RU, there are the read-out relay groups RT and RH. The read-out relay groups RT and RH provide for read-out of the counting relays T and H and the control of the secondaries of the transformers 23b and 23c. In addition to the control of the secondaries of the transformers 23a through 23c, the read-out relays also control the connections for the secondaries of the transformers 24a through 24c. This control is provided through the contacts e and f associated with each of the relays RU, RT and RH. For example, if we refer again to the previous example in which the RU7 relay is energized, it can be seen that its contacts RU7e and RU7f provide for an interruption of the by-pass circuit for the transformer secondary of the transformer 24a and a completion of seven segments of the secondary of the transformer 24a. This circuit is identical with that previously described in connection with the transformer secondary of the transformer 23a. The transformer secondaries of this group differ, however, from the transformer group 23 secondaries by the inclusion of the manual setter MS. The manual setter MS is divided into three adjustable groups provided with the manual tap setting adjustments MS1, MS2 and MS3. The manual setter MS is provided with turns on the cores of the transformers 24a, 24b and 24c, with the turns connected and wound in such a manner as to oppose the voltages developed by the normal secondary windings of the transformers 24a, 24b and 24c. The amount of opposition provided by the manual tap setter is adjusted by the taps MS1 through MS3.

It should be pointed out in connection with the transformer groups 23 and 24 that the secondaries controlled by the RT read-out relays associated with the transformers 23b and 24b are provided with ten times the number of turns found in the secondaries of the transformers 23a and 24a controlled by the RU relays. Similarly, the transformer secondaries associated with the transformers 23c and 24c are provided with ten times the number of turns found on the transformer secondaries associated with the transformers 23b and 24b. It can be seen, therefore, that voltage supplied by the hundreds read-out relays RH provides 100 times the output voltage supplied by the read-out relays RU while the secondaries associated with the RT relays supply ten times the output of the secondaries associated with the RU relays.

Each of the secondaries of the transformer group 23 is series connected and in turn series connected with each of the series connected secondaries of the transformer group 24. The combined outputs are then connected through the conductors X3 and Y3 to a phase sensitive circuit to be explained hereinafter.

In order to provide primary energy for the transformer groups 23 and 24, an additional counting chain 11 is provided. The counting chain 11 is reset at the end of each demand period by the TD relay contact 10 being interrupted through the energization of the demand relay TD. After the reset operation, the contact 10 becomes closed and the counting relays for the primary for the two transformers are conditioned to count in response to operation of the time to compute relay TC. At a time period following the beginning of the demand period, the time to compute relay TC is energized momentarily and returned to the deenergized condition. When this occurs, the contact 14 of the time to compute relay TC is momentarily closed to complete a pickup circuit for the count relay UM1. This circuit can be traced from the source terminal B, the back contact 10 of the TD relay, the now closed front contact 14 of the TC relay, the now closed back contact UM5b of the counting relay UM5, the closed back contact UM13a of the sequencing relay UM13, the closed back contact UM12a of the sequencing relay UM12, the closed back contact UM11a of the sequencing relay UM11, the relay winding UM1 to the source terminal N. Energization of the relay UM1 in response to the beginning of the time to compute period which, in the example, occurs five minutes following the beginning of the demand period causes the transformer primaries of the groups 23 and 24 to become energized. At the same time, the front contact UM1a of the relay UM1 establishes a stick circuit for the relay UM1 to maintain the relay energized following the dropping out or deenergization of the time to compute relay TC. The stick circuit can be traced from the source terminal B over the back contact UM12c of the relay UM12, the winding UM11 of the sequencing relay, the front contact UM1a of the relay UM1 to the source terminal N. Interruption of the pickup circuit by the contact 14 removes the shunt path from a sequencing relay UM11, allowing this relay to become energized. Energization of the relay UM11 prevents UM1 relay from again being picked up upon a subsequent closure of the contact 14. The contact UM5a of the UM5 relay is a make before UM5b break type of contact assuring UM5 energization for the entire time of the demand period.

Energization of the transformer primaries by the UM relays corresponding to the time periods established by the time to compute relay TC is obtained through the completion of contacts associated with the UM relays. For example, the UM1 relay upon being energized in the manner hereinbefore described results in the UM1d and UM1e contact being closed and the UM1f contact being opened. As a result of this action, one-fifth of the primary windings of each of the transformers 23a, 23b and 23c, are supplied with energy over the contact UM1d Likewise, the entire primary windings of the transformers 24a through 24c become energized upon the closure of UM1e with interruption of any possible by-pass circuit occurring with interruption or opening of the contact UM1f. It should be clear, therefore, that the transformer group 23 responds to the time elapsed in the demand periods while the transformer group 24 responds to the remaining time in the demand period.

During a demand period, there is a desirable or ideal consumption of power indicated in kilowatts. This ideal path or power consumption through the demand period is adjusted by the manual tap changer MS and is considered to be a 100% of the desired kilowatt hours to be reached at the end of the demand period. In order to continuously correct the use of power to obtain the 100% kilowatt hour usage, a reading and readjustment of the power flow to the load is taken every five minutes through the demand period in response to the time to compute relay TC operation. The amount of change needed in the power supply to the load can be represented by ΔKW which is determined each time the time to compute relay is energized. The amount of change in ΔKW is determined by the difference between the present load, represented by KW, experienced during the first part of the demand interval T1 and the calculated load, represented by KW₂, to be experienced during the remainder of the demand interval T2. The relationship can, therefore, be shown as follows:

$$\Delta KW = \frac{KWH \text{ used}}{TIME \text{ USED}} = \frac{KWH_2}{T_2} - \frac{KWH_1}{T_1}$$

Figure 2F:
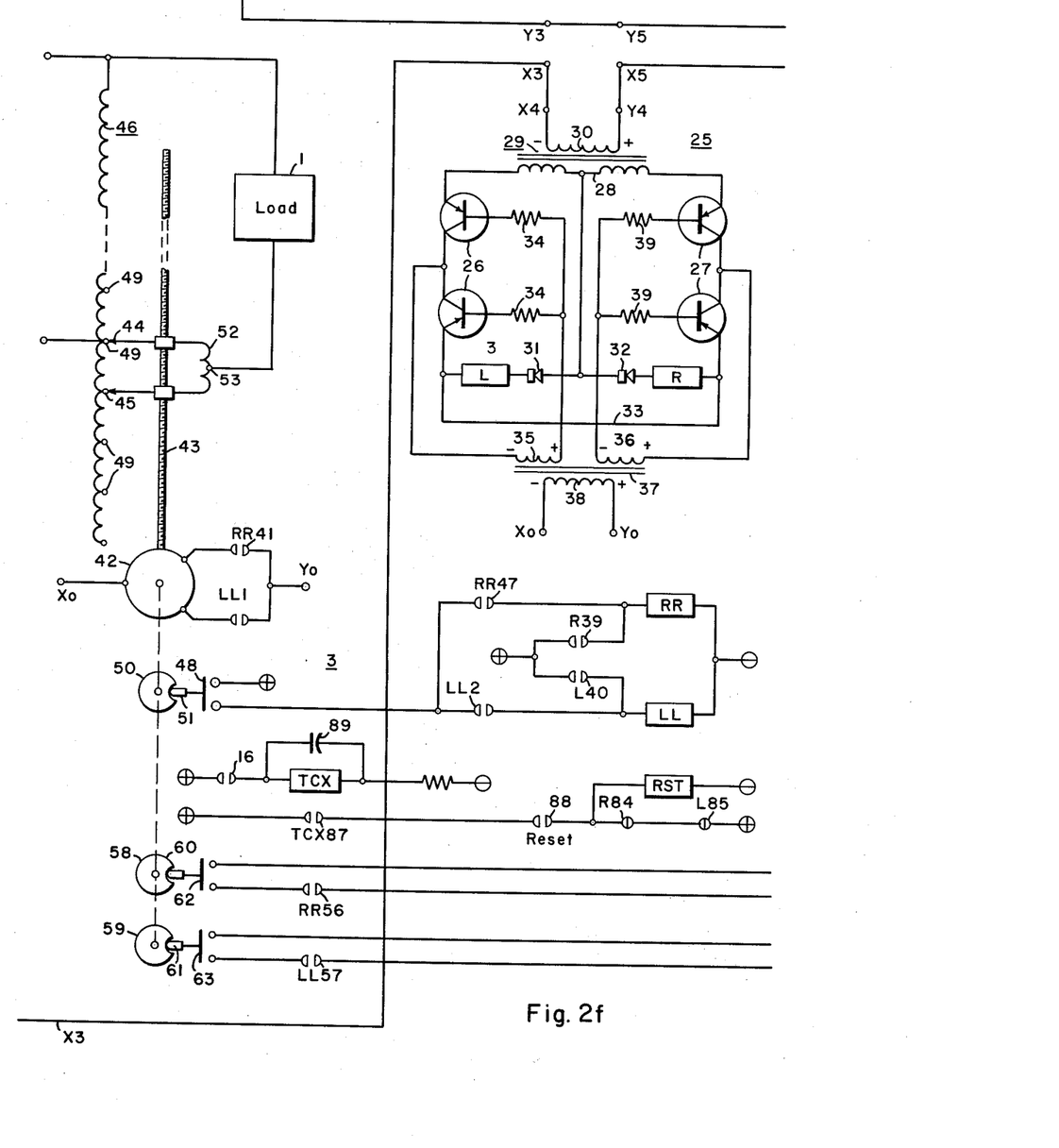
Figure 2G:
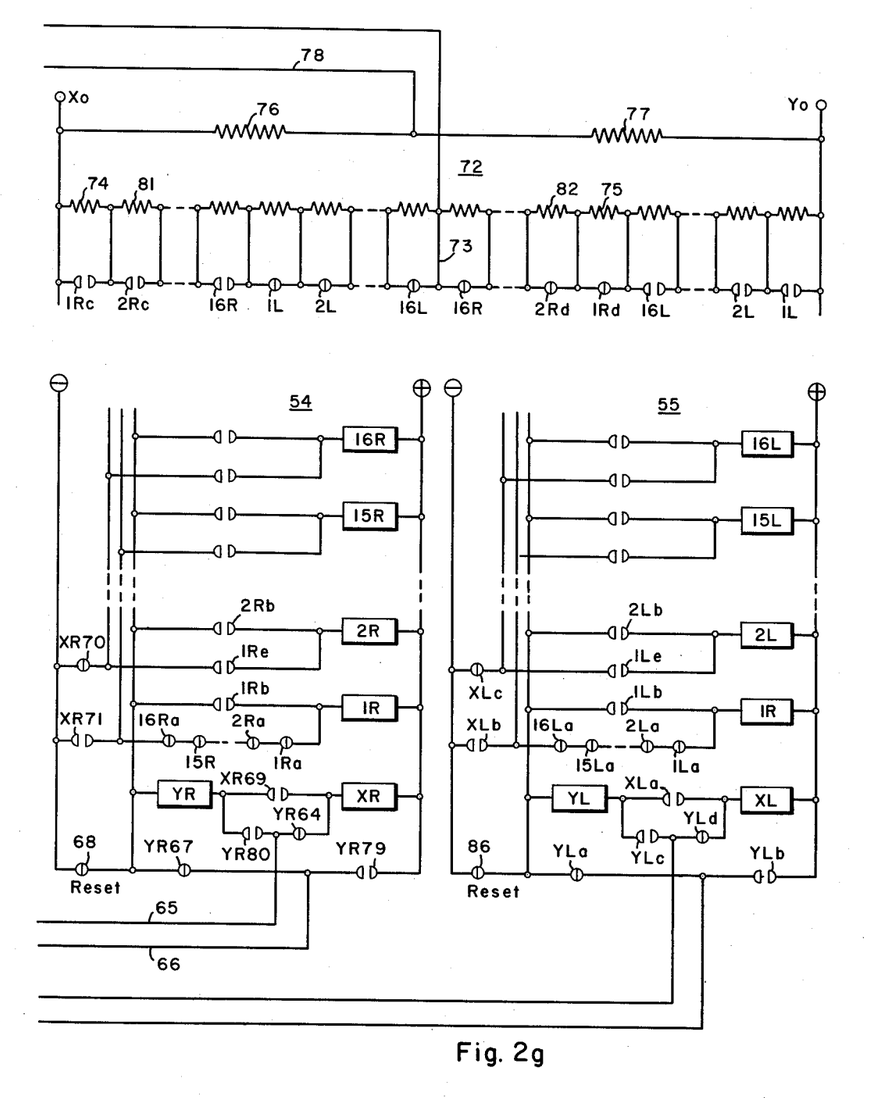

Referring again to FIG. 1, it can be seen that with the terminal points S1 shown in FIGS. 2b and 2g tied together as shown in FIG. 1 and with the terminal points X3 and Y3 brought out as output conductors, the voltage displayed as X3 and Y3 will be the ΔKW or load change needed to bring the load to the 100% level by the end of the demand period. The voltage appearing at X3, Y3 may be at any one instant of one polarity or the other depending upon whether the directed KW (power) delivery through the line 2 is greater or less than the manually established power level set by the manual setter MS. The voltage appearing at the X3, Y3 terminals is then combined with a stabilizing feedback voltage appearing on conductors X5, Y5, obtained in a manner to be explained hereinafter, and used to control a phase sensitive circuit 25 for the purpose of determining whether the supply of power to the load will be raised or lowered.

The phase sensitive circuit shown in FIG. 2f is one of many possible selected types of circuits suitable for performing the function needed. The phase sensitive circuit comprises two pairs of transistors 26 and 27 having their collectors connected together and with one transistor of each pair having its emitter connected to opposite ends of a center-tapped secondary 28 of a suitable transformer 29. The primary 30 of the transformer 29 is connected to conductors X4, Y4 for receiving the incoming signal from the transformer groups 23 and 24 as well as the incoming signal from the feedback circuit to be explained hereinafter. The remainder of the load circuit for the two pairs of transistors 26 and 27 comprise a raise relay R and rectifier 31 series connected between the remaining emitter of the transistor pair 26 and the center tap of the secondary 28 of the transformer 29. Likewise, the remaining load circuit for the transistor pair 27 comprises a lower relay L and series connected rectifier 32 connected between the remaining emitter of the transistor pair 27 and the center tap of the secondary 28. The rectifiers 31 and 32 are poled to respond to opposite polarities of current flow through the raise and lower relays R and L. In addition to the raise and lower relays and series connected rectifiers 31 and 32 being connected between the emitters of the load circuit transistors, there is provided a conductor 33 also connected between the two emitters to provide for current flow through the proper raise or lower relay regardless of which pair of transistors is conducting.

The transistor pairs 26 and 27 are provided with control voltages connected between the combined collectors of each pair and the base of each pair. Each of the transistors in each pair have their base electrodes tied together through suitable matching resistors 34 so that a common control source such as the secondaries 35 and 36 of a suitable transformer 37 can be used to provide the control voltage necessary for actuating one or the other pair of transistors 26 or 27. The transformer 37 is provided with a primary 38 and is connected to a suitable reference source of alternating current represented by the terminals Xo, Yo. A brief explanation of the operation of the support of this circuit will now be given, with a detailed explanation of the circuit being set forth in the AIEE Transactions of March 1955, page 121 and presented by Mr. R. O. Decker.

If we assume instantaneous voltages being supplied by the combined outputs of the transformer groups 23 and 24 to effect an inphase voltage with the control reference voltage supplied by the primary winding 38 of the transformer 37 and further if we assume that the transistors are of the PNP type, it can be seen that the transistor pair 27 would become active to conduct during the period when the polarity is as shown in the drawings. With the transistor pair 27 conducting, it can be seen that current flow in load circuit will pass through the transistors 27, the raise relay R, rectifier 32, to the center tap of the secondary 28. The rectifier 31 is connected to prevent current flow through the conductor 33 and relay L at this time. It is pointed out that one transistor of the transistor pair 27 is conducting in a reverse direction which actually gives a gain of one or less, and since it is being used as a switching device, the amount of gain is not important. With the two voltages supplied by the transformer primaries 30 and 38 in phase, the action of the circuit during the opposite half cycle of the pair of voltages results in the transistor pair 27 being cut off and the transistor pair 26 being energized. During this half cycle the transistor pair 26 supplies power to the raise relay R over the conductor 33 while the transistor pair 27 and lower relay L are cut off.

If the manual adjustment established by the manual control MS results in the supply of power to the load being greater than the manual adjustment when the comparison is made by the TC relay, it can be seen that the phase of the supply voltage representing ΔKW provided by the transformer groups 23 and 24 will be reversed with respect to the reference voltage supplied by the primary 38 to the transistor pairs 26 and 27. When this occurs, with the polarity being as shown on the primary winding, 30 is the opposite polarity to that showing in the primary winding 38 in the drawings. When this condition exists, the transistor pair 27 would conduct causing the load circuit current to flow through the lower relay L by way of conductor 33 because of the polarity of the series rectifiers associated with the raise and lower relays. On the next half cycle of the voltages supplied by the primary windings, 30 and 38 are still 180° out of phase resulting in transistor pair 26 conducting and also energizing the lower relay L.

The raise and lower relays R and L respectively are provided with controlling contacts 39 and 40 respectively shown in FIG. 1 as well as FIG. 2f for controlling the supply of power to a pair of repeater relays RR and LL, respectively, located normally with the power supply control represented by the block 3 of FIG. 1. If we assume, for example, that the phase sensitive control responds to a call for raising the power supply to the load, the R relay becomes energized by the phase sensitive control 25 causing the contact R39 to be closed for energizing the raise relay RR. The circuit can be traced from the positive terminal of a suitable source of power through the now closed contact R39 of the raised relay R, the winding RR to a negative terminal of a source of power. The relay RR upon becoming energized closes its front contact 41 for energizing the tap changing motor 42 to drive the tape changer mechanism drive screw 43 to move the taps 44 and 45 to the next tap on the autotransformer 46. At the same time, the relay RR closes its front contact RR47 to provide a stick circuit for the relay RR to assure movement of the taps 44 and 45 from one tap point on the transformer 46 to the next even though the raise relay R becomes deenergized. The stick circuit is completed over cam control contact 43 which is open only when the taps 44 and 45 are positioned on the adjacent tap points 49 on the autotransformer 46. The completed stick circuit can be traced from a positive source terminal of a suitable source of power over the contact 48 in its closed position, the now closed contact 47 of the RR relay, the relay RR winding to the negative terminal of the source of power. Even if the relay R becomes deenergized, the cam operated contact 48 will remain closed and continue to hold the relay RR energized until the motor 42 has moved the taps 44, 45 to the next tap points 49. Rotation of the motor 42 causes the cam 50 to rotate and cause the cam follower 51 to drive the contact member 48 to a closed position at any time the taps 44 and 45 are positioned between tap points 49.

The taps 44 and 45 are connected together through a matching winding 52 which is center tapped at 53 and connected to the load 1. Since the raise relay has indicated that a raise in power supply to the load 1 is needed, drive of the motor 42 would cause the taps 44 and 45 to move downwardly as viewed in the drawings to any tap positions 49 in the autotransformer 46 increasing the delivery of power to the load.

In order to provide a means of indicating whether the tap changer motor 42 has changed the taps sufficiently far to satisfy the load requirements as detected by the comparing transformers 23 and 24, it is necessary to provide a feedback voltage to balance the incoming signal ΔKW from the transformers 23 and 24 when the desired supply level to the load is reached. To provide this feedback voltage, a pair of counting chains 54 and 55 are provided controlled by the contacts RR56 and LL57 of the raise repeater relay RR and lower repeater relay LL, respectively. If we assume again that the raise relay and raise repeater relay RR have requested an increase in the power to the load 1, it can be seen that the contact RR56 of the repeater relay RR also becomes closed and with the motor 42 causing its drive to shift the contacts 44 and 45 to new positions, the cams 58 and 59 cause the cam followers 60 and 61, respectively, to close the contacts 62 and 63, respectively. With the closure of the contact 62 connected in series with the contact RR56 of the raise repeater relay, a circuit is completed for initiating the operation of the counting chain 54 through the energization of the relay XR. The energizing circuit can be traced from the positive terminal of the source of power, through the relay winding XR, the close back contact YR64 of the relay YR, the conductor 65, the cam contact 62, the now closed contact RR56 of the relay RR, the conductor 66, the now closed back contact YR67 of the relay YR, the now closed back contact RST68 of the reset relay RST to the negative source of power. Energization of the relay XR causes its contact XR69 to become closed and its normally closed back contact XR70 to be opened. The opening of the back contact 70 assures the release of any of the event count relays in the counting chain 54 that may have been energized by a previous operation. In addition to the contacts XR68 and XR70, the relay XR is provided with a contact XR71 utilized to complete a pickup circuit for the first raise count relay 1R. This circuit can be traced from a positive source of power through the relay 1R, the back contact 1Ra of the relay 1R, the back contact 2Ra of the relay 2R, and the back contacts of the relays 3R through 14R not shown in this drawing for simplifying reasons, the back contact 15Ra of the relay 15R, the back contact 16Ra of the relay 16R, the now closed contact XR71 of the relay XR to the negative source of power. Energization of the relay 1R causes its contact 1Rb to become closed to form a stick circuit for the relay 1R independent of the pickup circuit. This circuit can be traced from the positive terminal through the relay winding 1R and now closed contact 1Rb, the reset contact RST68 to the negative terminal of the source of power.

Movement of the tap changer to the next tap change point again causes the cam member 58 to release the contact member 62 interrupting the pickup circuit established for the relay XR. In doing so, the relay YR becomes energized since the shunt circuit around the relay YR has now become interrupted. The shunt circuit can be traced from the negative terminal through the reset contact RST68, the back contact YR67 of the relay YR, the conductor 66, raise repeater relay contact RR56, now open cam contact 62, conductor 65, the back contact YR64 of the relay YR, the relay winding XR to the positive source of power. Interruption of this circuit by the cam contact 62 allows the previously completed circuit of the series connected relays XR and YR to become effective to energize the relay YR. This circuit can be traced from the positive terminal through the relay winding XR, the now closed contact XR69 of the relay XR, the relay winding YR, the reset back contact RST68 to the negative source of power terminal.

When the relay 1R closes its contact 1Rc and opens its contact 1Rd, in the tap changing resistor arrangement 72, closure of the contact 1Rc reduces the resistance of the circuit between the conductor 73 and the source terminal X0 by shunting the resistor 74. At the same time, the opening of the relay contact 1Rd inserts the resistor 75 into the circuit between the conductor 73 and the source terminal Y0. This results in the potential of the conductor 73 moving closer to the X0 conductor and further away from the Y0 conductor with the total resistance between the X0 and Y0 conductors remaining the same. Connected between the X0 and Y0 conductors is a fixed voltage divider containing the resistors 76 and 77. Connected to a point between the resistors 76 and 77 is a conductor 78. It can be seen, therefore, that insertion and removal of the resistors 75 and 74, respectively, causes a potential difference to exist between the conductors 73 and 78 with this potential difference being applied to the terminals X5 and Y5 as a feedback voltage. It can also be seen that movement of the potential of the conductor 73 toward the X0 conductor provides one instantaneous voltage reference while movement of the potential of the conductor 73 toward the Y0 conductor during a lowering operation would cause a phase reversal of a potential appearing on the conductor 73 with respect to the conductor 78.

If we assume that the movement of the tap changer contacts 44 and 45 is not sufficient to satisfy the ΔKW voltage appearing at the terminals X3, Y3, motor 42 will continue in its drive again causing the cam contact member 62 to become closed resulting in the shunting of the relay XR. Shunting of the relay XR causes this relay to become deenergized while at the same time maintaining the relay YR energized. This circuit can be traced from the positive source terminal over the front contact YR79 of the relay YR, the conductor 66, the front contact RR56 of the relay RR, the now closed cam contact 62 of the cam 58, the conductor 65, the now closed contact YR80 of the relay YR, through the winding of the relay YR, the back contact RST68 of the reset relay to the negative source of power. Deenergization of the relay XR closes the back contact XR70 preparing the even-numbered relays 2R through 16R for possible energization. At the same time, front contacts XR71 of the relay XR interrupts any possible pickup circuit for the odd-numbered relays 1R through 15R. Closure of the contact XR70, due to the deenergization of the relay XR, energizes the relay 2R over the now closed front contact 1Re of the relay 1R. Energization of the relay 2R causes its contact 2Rb to establish the stick circuit similar to that described in connection with relay 1R, its contact 2Rc to shunt a resistor 81 and its contact 2Rd to insert a resistor 82. This action moves the conductor 73 in potential still closer to the X0 conductor and farther away from the Y0 conductor.

While this operation is taking place, the motor 42 continues to drive the taps 44 and 45 to the next tap points 49 or until the cams 50, 58 and 59 are again in the position shown in the drawings. If we assume that the energization of the relay 2R provides an adequate feedback voltage to match the ΔKW voltage derived from the transformer groups 23 and 24, it can be seen that the relay R becomes deenergized and the relay RR is maintained energized until the cam 50 is back to the position shown in the drawing. When the cam 50 again returns to this position, the relay RR again becomes deenergized, the tap changer drive motor becomes deenergized and the feedback circuit control becomes interrupted at the cam contact point 62 causing the relay YR to become deenergized, thus preventing any additional feedback relays from being energized.

At the next time to compute, determined by the clock CL, either the relay RR or LL may be energized depending upon the supply of power to the load as compared to the manually established power setting. Operation of the counting chains involved in the L relays is exactly the same as that described in connection with the R relays and will not be repeated. Reset operation takes place during each time to compute period or each five minutes in the example given in the specification. This reset operation takes place when a balance is reached between the manually adjusted load selection and the actual supply of power to the load is balanced. When this occurs, the raise and lower relays R and L become deenergized providing a pickup circuit for the reset relay RST over the now closed back contacts R84 and L85 of the raise and lower relays, respectively. Energization of the reset relay RST opens its contacts RST68 and RST86 interrupting any hold circuit for any of the feedback count relays of the groups 54 and 55 used to establish the feedback voltage on the adjustable potentiometer 72. The reset relay is maintained energized by the raise and lower relays until the end of the time to compute period has been reached, at which time the time to compute relay picks up and energizes a time delay relay TCX over a stick circuit completed by the contact 16 of the time to compute relay TC. Energization of the time delay relay TCX causes this relay to close its front contact TCX87 to complete a stick circuit for the relay RST over a circuit that can be traced from the positive source terminal over the contact TCX87 over the now closed contact RST88 of the reset relay RST, the reset relay RST winding to the negative terminal source of power. The time delay relay TCX assures the completion of the reset operation by assuring that the reset relay is energized for a time period before becoming deenergized in response to a raise or lower signal being detected by the raise and lower phase sensitive control 25. Since the TC relay is energized only momentarily, the TCX relay is maintained in its picked up condition by a suitabl condenser 89 for a time period after the contact 16 becomes open. If during the period that the TCX relay is energized, a raise or lower signal occurs opening the contacts R84 or L85, respectively, the reset relay RST will be maintained energized until the TCX relay discharges the condenser 89 and drops out. At the end of this period, the reset operation is complete and a new adjustment of the tap changing autotransformer 46 can take place. Operation of the lower relay L and its feedback control counting chain 55 is exactly the same as the raise relay and, therefore, will not be repeated. It is pointed out, however, that the contacts shown in the counting chain 55 are given the designation of the relay winding plus a small contact letter. For example, the first contact of the XL relay is designated XLa, etc.

The voltages appearing in the control computer can be identified by equations in the following manner. The voltage occurring or appearing at the points X1, Y3 of FIG. 1 resulting from the transformer group 23 is a voltage analog represented as:

$$KW_1 = \frac{E_o(KWH_1)\Delta NS}{T_1 \Delta NP}$$

where $KW_1$ is the present load during the first part of the demand period, $E_o$ is the constant voltage from the source of power applied to the primary controlling counting relays for energy application to the primary of the transformer group, $KWH_1$ is the kilowatt hours used in the demand period, $\Delta NS$ and $\Delta NP$ are equal to the incremental steps in the transformer secondary and primary windings and $T_1$ is the time used in the demand period. The voltage coming from the transformer group 24 appearing at the terminals X1, X3 is the voltage analog represented as:

$$KW_2 = \frac{E_o\{[(KWH_0)\Delta NS]-[(KWH_1)\Delta NS]\}}{(T_{\Delta d} NP) - (T_1 \Delta NP)}$$

where $KW_2$ is the calculated load during the remainder of the demand interval and $KWH_d$ is the maximum allowable demand adjusted by the manual adjuster MS, and $T_d$ is the permanent adjustment of the demand interval length which is present by the assembled structure. The voltage appearing at the terminals X3, Y3 as pointed out previously is the amount of change that must be obtained in order to make the proper adjustment of the load to reach a 100% kilowatt hour level and is represented by $$\Delta KW = KW_2 - KW_1$$

Since numerous changes may be made in the above described construction and different embodiments of the invention may be made without departing from the spirit and scope thereof, it is intended that all the matter contained in the foregoing description or shown in the accompanying drawings will be interpreted as illustrative and not in a limiting sense.

I claim as my invention:

1. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load.

2. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load, and feedback means connected to respond to said power supply control means to provide a balancing feedback control signal to said phase sensitive control means.

3. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load, and feedback means connected to respond to said power supply control means to provide a balancing feedback control signal to said phase sensitive control means, said feedback means comprising a tap changing potentiometer capable to varying its tap output voltage to a value above or below a reference level while maintaining a constant overall end-to-end impedance.

4. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load, said phase sensitive control means comprising a difference voltage, phase sensitive transistor switching devices responsive to the phase relationship of said algebraic sum as compared to said reference voltage.

5. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load, said phase sensitive control means comprising a difference voltage, phase sensitive transistor switching devices responsive to the phase relationship of said algebraic sum as compared to said reference voltage, a pair of relays, one of said pair of relays being energized upon one phase relationship and the other being energized upon the opposite phase relationship.

6. A demand control system for a load power supply comprising a power input line, a demand detector means connected to provide a first ouput in response to the demand on said power input line, first adjustable means for establishing a second output in response to the desired rate of power consumption by said load, power supply control means for adjusting the supply of power to said load and computer means connected to compare said first output with said second output to adjust said control means, said computer comprising a timing means for periodically causing said computer means to make said comparison, said timing means providing a demand period and a plurality of load power supply readjusting period during said demand periods.

7. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer comprising a timing means for periodically causing said computer means to make said comparison, said timing means providing a demand period and a plurality of load power supply readjusting period during said demand periods, and reset means for said system controlled by said timing means to reset said system at the end of each demand period.

8. A demand control system for a load power supply comprising a power input line, a demand detector means connected to provide a first output in response to the demand on said power input line, first adjustable means for establishing a second output in response to the desired rate of power consumption by said load, power supply control means for adjusting the supply of power to said load and computer means connected to compare said first output with said second output to adjust said control means, said computer means comprising a first tap changing transformer group and a first tap changing control means therefor, a second tap changing transformer group and a second tap changing control means therefor, a phase sensitive control means connected to receive outputs from said first and second tap changing transformer groups to respond to the algebraic sum of the outputs of said transformer groups, said phase sensitive control means providing an output to said power supply control means for proper adjustment of said supply of power to said load, and feedback means connected to respond to said power supply control means to provide a balancing feedback control signal to said phase sensitive control means, said feedback means comprising a tap changing potentiometer capable to varying its tap output voltage to a value above or below a reference level while maintaining a constant overall end-to-end impedance, and counting relays responsive to said phase sensitive control means for controlling said tap changes to provide a neutralizing feedback voltage opposing said algebraically summed outputs.

References Cited in the file of this patent

UNITED STATES PATENTS

| | | |
|---|---|---|
| 1,904,500 | McLenegan | Apr. 18, 1933 |
| 2,015,555 | Fountain | Sept. 24, 1935 |
| 2,103,818 | Kucera | Dec. 28, 1937 |
| 2,206,751 | Peyton | July 2, 1940 |
| 2,348,058 | Coates et al. | May 2, 1944 |